United States Patent
Nadu

[11] Patent Number: 6,058,617
[45] Date of Patent: May 9, 2000

[54] AUDIO VISUAL COMBINATION EXTENSION LEVEL

[76] Inventor: Samuel Nadu, 560 Truce Rd., New Providence, Pa. 17560

[21] Appl. No.: 09/001,433

[22] Filed: Dec. 31, 1997

[51] Int. Cl.⁷ .................................................. G01C 9/06
[52] U.S. Cl. ......................... 33/366.12; 33/374; 33/451; 33/460
[58] Field of Search ........................... 33/366.11, 366.12, 33/366.15, 36.18, 366.21, 366.26, 374, 375, 451, 459, 460, 461, 462, 463

[56] References Cited

U.S. PATENT DOCUMENTS

| | | | |
|---|---|---|---|
| Re. 32,962 | 6/1989 | Tudek | 33/366.12 |
| 907,511 | 12/1908 | Larson | 33/462 |
| 1,336,102 | 4/1920 | Smith | 33/459 |
| 1,624,535 | 4/1927 | Christianson | 33/461 |
| 2,878,569 | 3/1959 | Metrulis | 33/451 |
| 3,104,477 | 9/1963 | Edwill | 33/374 |
| 3,861,052 | 1/1975 | Siegfried | 33/366.26 |
| 4,079,521 | 3/1978 | Uhorczak | 33/366.12 |
| 4,152,839 | 5/1979 | McDonald | 33/366.12 |
| 4,317,289 | 3/1982 | Conn | 33/451 |
| 4,506,450 | 3/1985 | Fleming et al. | 33/366.12 |
| 5,586,395 | 12/1996 | Malczewski | 33/451 |
| 5,839,200 | 11/1998 | Decesare | 33/374 |

FOREIGN PATENT DOCUMENTS

19782    7/1899   Switzerland ............................. 33/451

*Primary Examiner*—G. Bradley Bennett

[57] ABSTRACT

An electronic level is provided including a central member having a rectilinear configuration and an electronic level indicator mounted thereon.

2 Claims, 2 Drawing Sheets

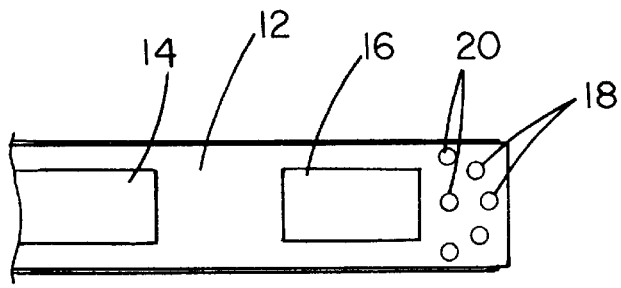
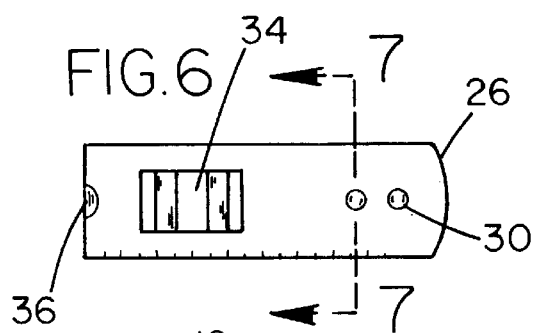
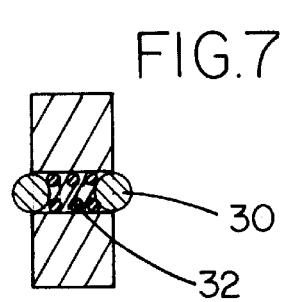
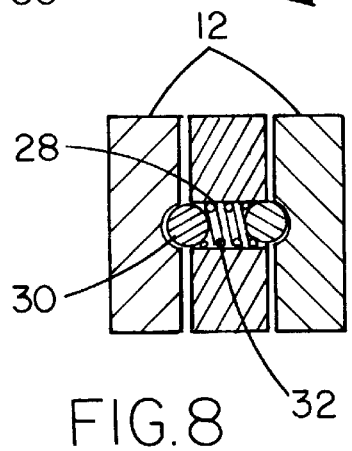
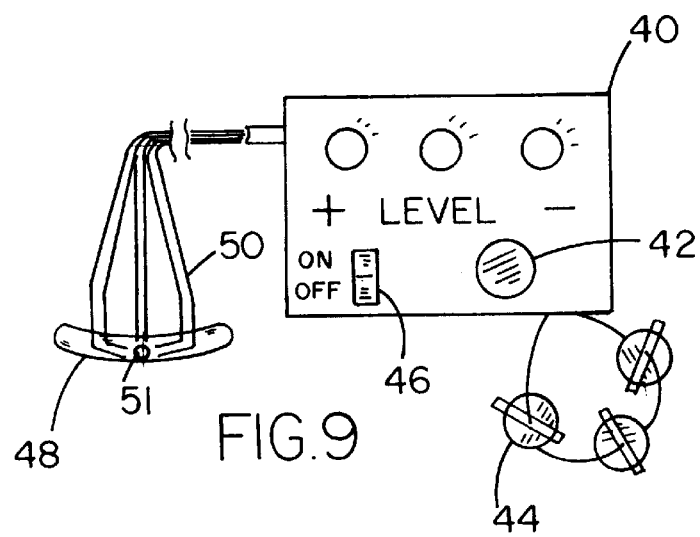
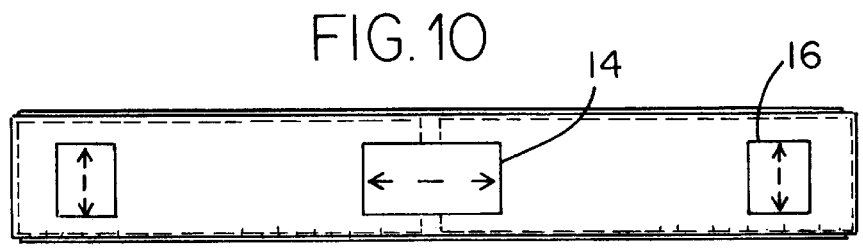

ns, since the invention is capable of other embodiments and of being practiced and carried out in various ways. Also, it is to be understood that the phraseology and terminology employed herein are for the purpose of description and should not be regarded as limiting.

AUDIO VISUAL COMBINATION EXTENSION LEVEL

BACKGROUND OF THE INVENTION

1. Field of the Invention

The present invention relates to levels and more particularly pertains to a new audio visual combination extension level for giving an audible and visual indication of whether a surface is level.

2. Description of the Prior Art

The use of levels is known in the prior art. More specifically, levels heretofore devised and utilized are known to consist basically of familiar, expected and obvious structural configurations, notwithstanding the myriad of designs encompassed by the crowded prior art which have been developed for the fulfillment of countless objectives and requirements.

Known prior art levels include U.S. Pat. No. 5,249,365; U.S. Pat. No. 5,155,917; U.S. Pat. No. 4,399,616; U.S. Pat. No. 5,442,864; U.S. Pat. No. 4,989,332; and U.S. Pat. No. Des. 362,399.

In these respects, the audio visual combination extension level according to the present invention substantially departs from the conventional concepts and designs of the prior art, and in so doing provides an apparatus primarily developed for the purpose of giving an audible and visual indication of whether a surface is level.

SUMMARY OF THE INVENTION

In view of the foregoing disadvantages inherent in the known types of levels now present in the prior art, the present invention provides a new audio visual combination extension level construction wherein the same can be utilized for giving an audible and visual indication of whether a surface is level.

The general purpose of the present invention, which will be described subsequently in greater detail, is to provide a new audio visual combination extension level apparatus and method which has many of the advantages of the levels mentioned heretofore and many novel features that result in a new audio visual combination extension level which is not anticipated, rendered obvious, suggested, or even implied by any of the prior art levels, either alone or in any combination thereof.

To attain this, the present invention generally comprises a pair central members each having a rectangular configuration with an outboard face, an inboard face, and a periphery formed therebetween. The periphery is defined by a long top edge, a long bottom edge, and a pair of short side edges. As shown in FIGS. 1–3, each central member has a central rectangular cut out formed therein and a pair of side rectangular cut outs formed therein adjacent opposite side edges. A plurality of spaced indents configured in an hemicircular configuration are formed in the inboard face adjacent to each of the end edges, as shown in FIG. 5. A pivot indent is formed in the inboard face at a center of the space indents. Indicia lines the top and bottom edge for measurement purposes. It should be noted that the central members are coupled in spaced relationship to define a slot therebetween. For allowing the same to be releasably coupled to a metallic surface, a plurality of elongated magnetic strips are each mounted to the top and bottom edge of each of the central members. Next provided is a pair of side members each having a rectangular configuration with an outboard face, an inboard face, and a periphery formed therebetween. Such periphery is defined by a long top edge, a long bottom edge, and a pair of short side edges. The side members each have a length which is less than half that of the central members. Each side member includes a pair of apertures formed between the faces thereof adjacent to a first one of the side edges. A pair of ball bearings are slidably situated within each of the apertures. A spring is positioned between the ball bearings for urging the same to partially protrude from the faces. A rectangular cut out is formed in the side members. A pair of semi-spherical gripping indentations are formed in the inboard and outboard faces at a second one of the side edges thereof. Similar to the central members, the side members each have indicia lining the top and bottom edge for measurement purposes. During use, the side members are slidably situated within the slot of the central members with a first orientation entirely within the slot. In such orientation, the second one of the side edges of the side member remains flush with the corresponding side edges of the central members. The side members further have a second orientation fully extended from the slot such that the ball bearings are in engagement with the pivot indent and one of the spaced indents of each of the central members thereby allowing the side members to pivot about a central axis defined by the pivot indent. It should be noted that the side members each pivot between discrete angles defined by the spaced indents. As shown in FIG. 10, a plurality of level indicators are provided each including a first light emitting diode, a second light emitting diode and a third light emitting diode. Each light emitting diode is adapted to illuminate upon the receipt of power. Associated therewith is a piezo electric buzzer adapted to emit a sound upon the receipt of power. A plurality of watch batteries are also provided. A power toggle switch is connected to the batteries and has a first orientation for allowing the passage of power and a second orientation for precluding the passage of power. FIG. 9 further shows a mercury switching unit including an arcuate tubular housing with three pairs of wires mounted therein. Each pair of wires constitutes a switch and has a pair of ends mounted to a central extent of the housing and adjacent each end of the housing. By this structure, each switch of the switching assembly is connected between an associated one of the light emitting diodes and the power toggle switch. Further, the buzzer is connected between the center switch of the switching assembly and the battery. As such, a ball of mercury situated within the housing of the switching assembly supplies power to the buzzer and central light emitting diode upon the housing being level. The ball of mercury further supplies power to one of the remaining light emitting diodes when the housing is not level. As shown in the Figures, the level indicators include a first level indicator mounted in the central rectangular cut out of the central member, a second level indicator mounted in the rectangular cut out of a first one of the side members, and a third level indicator mounted in the rectangular cut out of the central member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new audio visual combination extension level apparatus and method which has many of the advantages of the levels mentioned heretofore and many novel features that result in a new audio visual combination extension level which is not anticipated, rendered obvious, suggested, or even implied by any of the prior art levels, either alone or in any combination thereof.

It is another object of the present invention to provide a new audio visual combination extension level which may be easily and efficiently manufactured and marketed.

It is a further object of the present invention to provide a new audio visual combination extension level which is of a durable and reliable construction.

An even further object of the present invention is to provide a new audio visual combination extension level which is susceptible of a low cost of manufacture with regard to both materials and labor, and which accordingly is then susceptible of low prices of sale to the consuming public, thereby making such audio visual combination extension level economically available to the buying public.

Still yet another object of the present invention is to provide a new audio visual combination extension level which provides in the apparatuses and methods of the prior art some of the advantages thereof, while simultaneously overcoming some of the disadvantages normally associated therewith.

Still another object of the present invention is to provide a new audio visual combination extension level for giving an audible and visual indication of whether a surface is level.

Even still another object of the present invention is to provide a new audio visual combination extension level that includes a central member having a rectilinear configuration and an electronic level indicator mounted thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front view of the present invention with the side members retracted.

FIG. 6 is a front view of a side member of the present invention.

FIG. 7 is a cross-sectional view of the side member taken along line 7—7 shown in FIG. 5.

FIG. 8 is cross-sectional view of the present invention taken along line 8—8 shown in FIG. 3.

FIG. 9 is a front view of the electronic level indicator of the present invention.

FIG. 10 is a front view of the present invention.

DESCRIPTION OF THE PREFERRED EMBODIMENT

Figure 1:
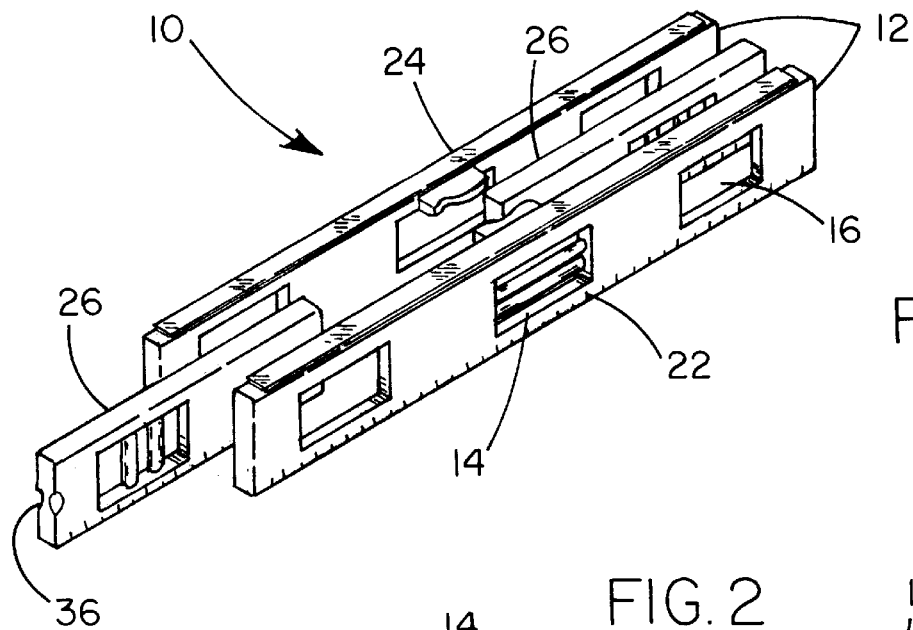
FIG. 1 is a perspective view of a new audio visual combination extension level according to the present invention.

With reference now to the drawings, and in particular to FIGS. 1 through 10 thereof, a new audio visual combination extension level embodying the principles and concepts of the present invention and generally designated by the reference numeral 10 will be described.

Figure 2:
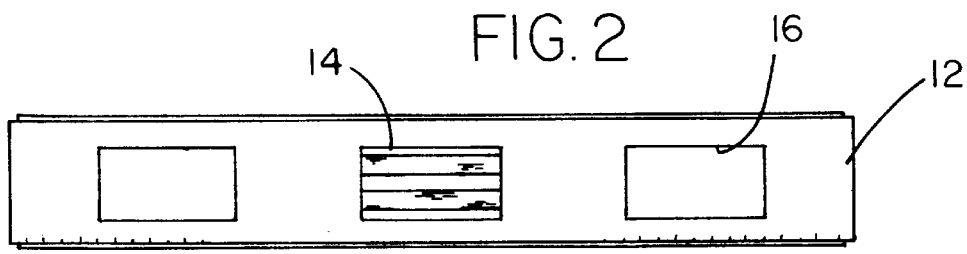
FIG. 2 is a front view of the present invention.
Figure 3:
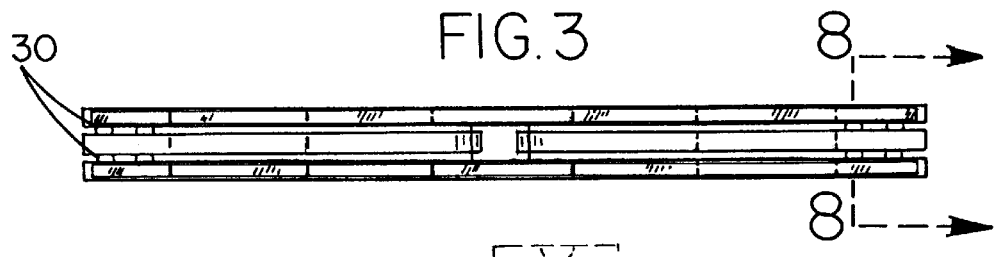
FIG. 3 is a top view of the present invention.
Figure 4:
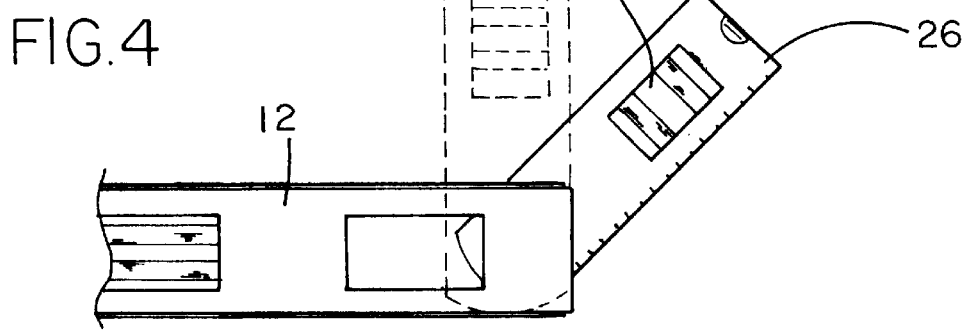
FIG. 4 is a view of the pivoting nature of the side members of the present invention.

The present invention, as designated as numeral 10, includes a pair central members 12 each having a rectangular configuration with an outboard face, an inboard face, and a periphery formed therebetween. The periphery is defined by a long top edge, a long bottom edge, and a pair of short side edges. As shown in FIGS. 1–3, each central member has a central rectangular cut out 14 formed therein and a pair of side rectangular cut outs 16 formed therein adjacent opposite side edges. A plurality of spaced indents 18 configured in an hemi-circular configuration are formed in the inboard face adjacent to each of the end edges, as shown in FIG. 5. A pivot indent 20 is formed in the inboard face at a center of the space indents.

Indicia 22 lines the top and bottom edge for measurement purposes. It should be noted that the central members are coupled in spaced relationship to define a slot therebetween. Such is preferably accomplished by way of a pair of interconnects coupled between a central extent of the bottom and top edges of the central members. For allowing the same to be releasably coupled to a metallic surface, a plurality of elongated magnetic strips 24 are each mounted to the top and bottom edge of each of the central members.

Next provided is a pair of side members 26 each having a rectangular configuration with an outboard face, an inboard face, and a periphery formed therebetween. Such periphery is defined by a long top edge, a long bottom edge, and a pair of short side edges. The side members each have a length which is less than half that of the central members. Each side member includes a pair of apertures 28 formed between the faces thereof adjacent to a first one of the side edges. A pair of ball bearings 30 are slidably situated within each of the apertures. A spring 32 is positioned between the ball bearings for urging the same to partially protrude from the faces. While not shown, the periphery of the apertures has a reduced diameter to prevent the ball bearings from being removed. A rectangular cut out 34 is formed in the side members. A pair of semi-spherical gripping indentations 36 are formed in the inboard and outboard faces at a second one of the side edges thereof. Similar to the central members, the side members each have metric and standard indicia 38 lining the top and bottom edges of the side members for measurement purposes.

During use, the side members are slidably situated within the slot of the central members with a first orientation entirely within the slot. In such orientation, the second one of the side edges of each side member remains flush with the corresponding side edges of the central members. The side members further have a second orientation fully extended from the slot such that the ball bearings are in engagement with the pivot indent and one of the spaced indents of each of the central members thereby allowing the side members to pivot about a central axis defined by the pivot indent. It should be noted that the side members each pivot between discrete angles defined by the spaced indents.

As shown in FIG. 10, a plurality of level indicators 40 are provided each including a first light emitting diode, a second light emitting diode and a third light emitting diode. Each light emitting diode is adapted to illuminate upon the receipt of power. Associated therewith is a piezo electric buzzer 42 adapted to emit a sound upon the receipt of power. A plurality of watch batteries 44 are also provided. A power toggle switch 46 is connected to the batteries and has a first orientation for allowing the passage of power and a second orientation for precluding the passage of power.

FIG. 9 further shows a mercury switching unit 48 including an arcuate tubular housing with three pairs of wires 50 mounted therein. Each pair of wires constitutes a switch and has a pair of ends mounted to a central extent of the housing and adjacent each end of the housing. Each switch of the switching assembly is connected between an associated one of the light emitting diodes and the power toggle switch. Further, the buzzer is connected between the center switch of the switching assembly and the battery. Preferably, the buzzer only actuates upon the mercury residing in the central extent of the arcuate tubular housing for a predetermined amount of time to prevent inadvertent actuation when the mercury passes from one end switch to the other.

As such, a ball of mercury 51 situated within the housing of the switching assembly supplies power to the buzzer and central light emitting diode upon the housing being level. The ball of mercury further supplies power to one of the remaining light emitting diodes when the housing is not level. As shown in the Figures, the level indicators include a first level indicator mounted in the central rectangular cut out of the central member, a second level indicator mounted in the rectangular cut out of a first one of the side members, and a third level indicator mounted in the rectangular cut out of the central member.

In an alternate embodiment, the electronic level indicator may be replaced with a standard bubble-type mechanical substitute. Further, it should be noted that the level indicators may be removable and replaceable. This is especially critical in the event that such indicators are broken or defective in some respect.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic extendible and adjustable level comprising, in combination:

a pair of central members each having a rectangular configuration with an outboard face, an inboard face, and a periphery formed therebetween defined by a long top edge, a long bottom edge, and a pair of short side edges, each central member having a central rectangular cut out formed therein, a pair of side rectangular cut outs formed therein adjacent opposite side edges, a plurality of spaced indents configured in an hemicircular configuration formed in the inboard face adjacent to each of the end edges, a pivot indent formed in the inboard face at a center of the spaced indents, and indicia lining the top and bottom edge for measurement purposes, the central members coupled in spaced relationship to define a slot therebetween;

a plurality of elongated magnetic strips each mounted to the top and bottom edge of each of the central members thereby allowing the same to be releasably coupled to a metallic surface;

a pair of side members each having a rectangular configuration with a first face, a second face, and a periphery formed therebetween defined by a long top edge, a long bottom edge, and a pair of short side edges, the side members each having a length which is less than half that of the central members, each side member having a pair of apertures formed between the faces thereof adjacent to a first one of the side edges, a pair of ball bearings slidably situated within each of the apertures, a spring positioned between the ball bearings for urging the same to partially protrude from the faces, a rectangular cut out formed therein, a pair of semispherical gripping indentations formed in the second and first faces at a second one of the side edges thereof, and indicia lining the top and bottom edge for measurement purposes, whereby the side members are slidably situated within the slot of the central members with a first orientation entirely within the slot and the second one of the side edges flush with the corresponding side edges of the central members and a second orientation fully extended from the slot such that the ball bearings are in engagement with the pivot indent and one of the spaced indents of each of the central members thereby allowing the side members to pivot about a central axis defined by the pivot indent between discrete angles defined by the spaced indents;

a plurality of level indicators each including a first light emitting diode, a second light emitting diode and a third light emitting diode each adapted to illuminate upon the receipt of power, a piezo electric buzzer adapted to emit a sound upon the receipt of power, a plurality of watch batteries, a power toggle switch connected to the batteries and having a first orientation for allowing the passage of power and a second orientation for precluding the passage of power, and a mercury switching unit including an arcuate tubular housing with three pairs of wires mounted therein each constituting a switch and having a pail of ends mounted to a central extent of the housing and adjacent each end of the housing wherein each switch of the switching assembly is connected between an associated one of the light emitting diodes and the power toggle switch, the buzzer connected between the center switch of the switching assembly and the battery whereby a ball of mercury is situated within the housing of the switching assembly for supplying power to the buzzer and central light emitting diode upon the housing being level and further supplying power to one of the remaining light emitting diodes when the housing is not level, the level indicators including a first level indicator mounted in the central rectangular cut out of the central member, a second level indicator mounted in the rectangular cut out of a first one of the side members, and a third level indicator mounted in the rectangular cut out of the central member.

2. An electronic extendible and adjustable level comprising:

a pair of central members each having a rectangular configuration with an outboard face, an inboard face, and a periphery formed therebetween defined by a long top edge, a long bottom edge, and a pair of short side edges, each central member having a central cut out formed therein, a pair of side cut outs formed therein adjacent opposite side edges, a plurality of spaced indents configured in an hemi-circular configuration formed in the inboard face adjacent to each of the end edges, a pivot indent formed in the inboard face at a center of the spaced indents, and indicia lining the top and bottom edge for measurement purposes, the central members being coupled in spaced relationship to define a slot therebetween;

a plurality of elongated magnetic strips, each strip being mounted to one of the top and bottom edges of each of the central members for allowing the central members same to be releasably coupled to a metallic surface;

a pair of side members each having a first face, a second face, and a periphery formed therebetween defined by a long top edge, a long bottom edge, and a pair of short side edges, the side members each having a length which is less than half that of the central members, each side member having an aperture formed between the faces thereof, a pair of ball bearings situated in each of the apertures, a spring positioned between the ball bearings for urging the same to partially protrude from the faces, a cut out formed in each of the side members, and indicia lining the top and bottom edges of the side members for measurement purposes, whereby the side members are slidably situated in the slot of the central members with a first orientation entirely within the slot and the second one of the side edges flush with the corresponding side edges of the central members and a second orientation fully extended from the slot such that the ball bearings are in engagement with the pivot indent and one of the spaced indents of each of the central members thereby allowing the side members to pivot about a central axis defined by the pivot indent between discrete angles defined by the spaced indents;

a plurality of level indicators each including a first light, a second light and a third light each adapted to illuminate upon the receipt of power, a buzzer adapted to emit a sound upon the receipt of power, a plurality of batteries, a switch connected to the batteries and having a first orientation for allowing the passage of power and a second orientation for precluding the passage of power, and a switching unit including an arcuate tubular housing with three pairs of wires mounted therein each constituting a switch and having a pair of ends mounted to a central extent of the housing and adjacent each end of the housing wherein each switch of the switching assembly is connected between an associated one of the lights and the switch, the buzzer connected between the center switch of the switching assembly and the battery whereby a ball of mercury is situated in the housing of the switching assembly for supplying power to the buzzer and central light upon the housing being level and further supplying power to one of the remaining lights when the housing is not level, the level indicators including a first level indicator mounted in the central cut out of the central member, a second level indicator mounted in the cut out of a first one of the side members, and a third level indicator mounted in the cut out of the central member.

* * * * *